(No Model.)
I. POLHAMUS.
BICYCLE ATTACHMENT.
No. 499,581. Patented June 13, 1893.
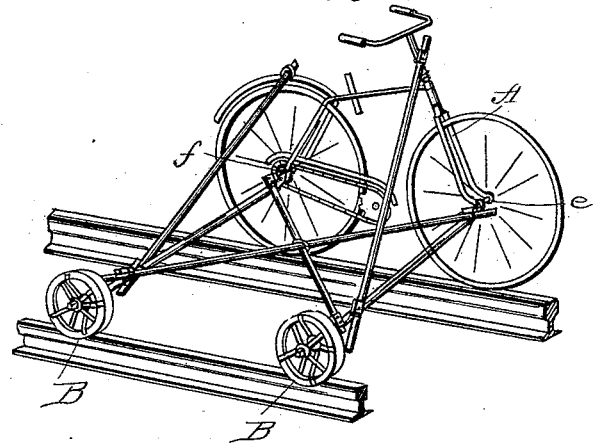
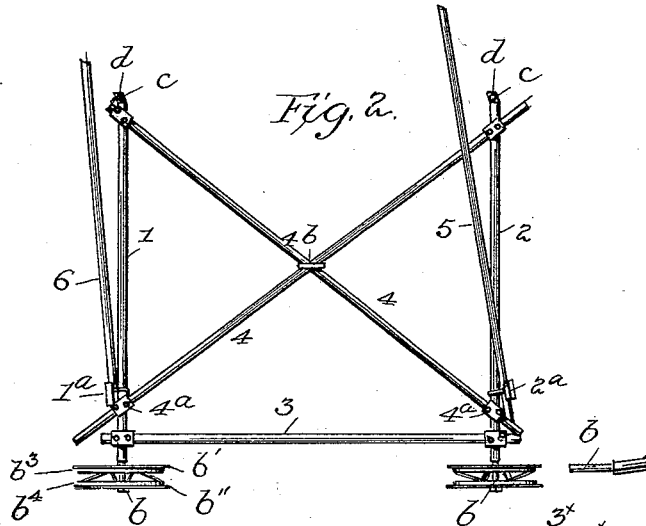
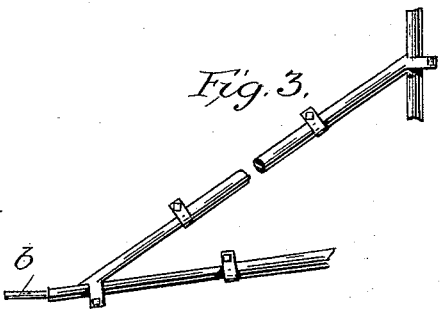
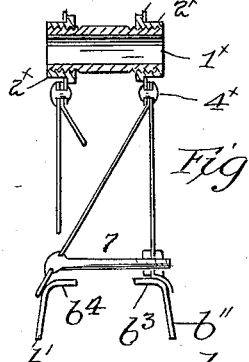
Attest  
*[signatures]*
Inventor  
Isaac Polhamus  
by Ellis Spear  
Atty.

UNITED STATES PATENT OFFICE.

ISAAC POLHAMUS, OF SAN DIEGO, CALIFORNIA.

BICYCLE ATTACHMENT.

SPECIFICATION forming part of Letters Patent No. 499,581, dated June 13, 1893.

Application filed February 20, 1893. Serial No. 463,075. (No model.)

*To all whom it may concern:*

Be it known that I, ISAAC POLHAMUS, a citizen of the United States of America, residing at San Diego, in the county of San Diego and State of California, have invented certain new and useful Improvements in Attachments for Bicycles, of which the following is a specification.

My invention is an improved attachment for bicycles designed to render the bicycle capable of being ridden upon the railroad track, and I have aimed to provide a simple and effective attachment which may be readily attached to an ordinary safety bicycle to enable the rider to use it upon the railroad, while at the same time the device is light and may be easily detached and carried by the rider when riding upon ordinary roads.

I have illustrated the invention in the accompanying drawings in which—

Figure 1 is a perspective view of the invention shown in connection with a safety bicycle, and Fig. 2 is a plan view of the attachment. Fig. 3 is a detail of the rod connections, and Fig. 4 a view of guide wheel.

The bicycle, shown at A, is designed to travel upon the center of one of the railroad rails and is held upright thereon by connections to the guide wheels B, which run upon the opposite rail of the track. These guide wheels B, of which there are two, one opposite each wheel of the bicycle, are journaled upon axles $b$ which are connected to the ends of rods 1, 2, preferably formed of hollow tubing. The opposite ends of these rods or tubes are provided with angle irons $c$ rigidly secured therein, these angle irons being provided with holes $d$, designed to receive the ends of the axles $e$, $f$, of the front and rear wheels of the bicycle.

The guide wheels B, are designed to prevent any side motion of the bicycle, and for this purpose they are formed with depending flanges $b'$, and $b''$ which extend down upon either side of the rail. I prefer to make these wheels of two sections of sheet metal, each section having a flat portion or tread $b^3$, $b^4$ and a flange $b'$ and $b''$ as before stated. By thus forming the wheels of the two sections these sections may be made adjustable toward and from each other to widen the space between the flanges to adapt the guide wheels to different weights of rails. The ends of the rods 1, and 2, adjacent to the guide wheels, are connected by a rod 3, which holds the guide wheels a fixed distance apart, and they are further braced by the diagonally placed rods 4, 4', which are connected to the ends of the brass rods at $4^a$, and to each other at the crossing point $4^b$.

For holding the bicycle upright on the rail two braces 5, 6, are provided, the first extending from the rod 2 at $2^a$ to the upper part of the machine, as for instance the handle bar where it is securely attached, and the second extending from the rod 1 at $1^a$ to some point in rear of the machine, such as the rear mud guard if the machine is provided with a rigid guard. It will thus be seen that while the rods 1 and 2 with their brace rods hold the bicycle securely at a determined distance from the guide wheels, the inclined brace rods 5 and 6 hold the bicycle in a vertical position, and as the head is held against turning the machine will travel forward upon the track, the wheels of the bicycle running upon the center of the rail and being held from slipping therefrom by the flanges of the guide wheels.

I find in practice that it is desirable to form the rods 1 and 2, from brass tubing as before stated, while the remaining rods may be made of bamboo or of hollow tubing of any desirable metal with adjustable connections at the points where the rods are attached to each other or to the bicycle.

In order to facilitate the carrying of the apparatus when the bicycle is to be ridden upon ordinary streets or roads it is desirable to form the connecting rods and braces of telescoping rods so that when the apparatus is detached from the bicycle it may be folded into a small and compact parcel and be readily and easily carried by the rider, and when it is desired, the device may be quickly unfolded and attached to the bicycle as before explained. This telescoping structure of the rods is shown in Fig. 3, where the sections 25, 26, 27, are shown jointed together by the clamps C, the sections being split at 28 to secure the clamping effect.

The wheel consists of a hub $1^x$ having threaded ends, and receiving nuts $2^x$ which have collars on their inner ends. Over these nuts and against the collars the washers $3^x$ fit. The flat spokes of the wheel are secured to these washers by rivets or bolts 4×. The spokes extend vertically to the rim located on the same side with the washer to which the inner ends of the spokes are attached, while the other set of spokes 9 extend diagonally from the washer on one side to the rim on the other side. The spokes may be adjusted to and from each other by the bolts 7, and nuts 7×, and the rims may thus be adjusted to suit rails of different widths.

Having thus described my invention, what I claim is—

1. An attachment for bicycles of ordinary form comprising a frame adapted to be secured to the bicycle and double flanged wheels carried by said frame adapted to travel upon both sides of one rail and maintain the bicycle upon the other rail, substantially as described.

2. An attachment for bicycles comprising a pair of rods provided with means for securing their ends to the ends of the axles of a bicycle, a pair of flanged wheels having their axles secured to the other ends of said rods, a longitudinal rod connecting said pair of rods with diagonal bracing, and inclined bracing connected to the frame of the machine, substantially as described.

3. An attachment for bicycles comprising a pair of rods provided at one end with recessed angle irons adapted to be secured to the axles of a bicycle, suitable bracing for said rods, a pair of double flanged wheels having their axles secured to the other ends of said rods, with inclined bracing for holding the bicycle upright, substantially as described.

4. An attachment for bicycles comprising a pair of cross rods, recessed angle irons in one end thereof, brace rods connecting said rods, double flanged wheels journaled upon the other ends of said rods, with inclined bracing for holding the bicycle in a vertical position, substantially as described.

5. An attachment for bicycles comprising the cross rods adapted to be secured to a bicycle and provided with suitable bracing, a pair of double flanged guide wheels journaled upon said cross rods, said guide wheels being composed each of a pair of disks adjustable toward and from each other, substantially as described.

6. In combination with the folding cross rods detachably connected at one end to the axles of a bicycle, folding bracing connected to said rods and to the frame of the bicycle, and a pair of flanged wheels having their axles detachably secured to the other ends of the cross rods, substantially as described.

In testimony whereof I affix my signature in presence of two witnesses.

ISAAC POLHAMUS.

Witnesses:
A. G. BETTENS,
K. C. PINKHAM.